United States Patent [19]

Ito et al.

[11] Patent Number: 5,012,633
[45] Date of Patent: May 7, 1991

[54] LAWN MOWER

[75] Inventors: Kunio Ito; Takeshi Konno; Yutaka Tabata, all of Saitama, Japan

[73] Assignee: Honda Giken Kabushiki Kaisha, Tokyo, Japan

[21] Appl. No.: 503,476

[22] Filed: Apr. 2, 1990

[30] Foreign Application Priority Data

| Apr. 3, 1989 | [JP] | Japan | 1-84552 |
| Apr. 3, 1989 | [JP] | Japan | 1-84553 |
| Apr. 3, 1989 | [JP] | Japan | 1-84884 |

[51] Int. Cl.$^5$ ............... A01D 34/73; A01D 34/76; A01D 34/82; A01D 55/00
[52] U.S. Cl. ............... 56/12.9; 56/13.4; 56/16.9; 56/295
[58] Field of Search ............... 56/12.9, 13.4, 16.9, 56/295, 320.2, 12.8, 17.5

[56] References Cited

U.S. PATENT DOCUMENTS

| 1,827,559 | 10/1931 | Beazley | 56/12.9 |
| 2,491,544 | 12/1949 | Arkenberg | 56/12.9 |
| 2,547,328 | 4/1951 | Koch et al. | 56/12.9 |
| 3,676,893 | 7/1972 | Smythe | 56/13.4 |
| 3,696,595 | 10/1972 | Dahl | 56/16.9 |
| 3,959,954 | 6/1976 | Halsten | 56/12.8 |
| 3,975,891 | 8/1976 | Gunther | 56/295 |
| 4,121,405 | 10/1978 | Wolf | 56/12.9 |
| 4,161,096 | 7/1979 | Biberger | 56/12.9 |
| 4,194,345 | 3/1980 | Pioch et al. | 56/17.5 |
| 4,466,235 | 8/1984 | Cole | 56/16.9 |

FOREIGN PATENT DOCUMENTS

| 1152716 | 5/1969 | United Kingdom . |
| 1198518 | 7/1970 | United Kingdom . |
| 1215017 | 12/1970 | United Kingdom . |
| 1254556 | 11/1971 | United Kingdom . |

Primary Examiner—Stephen J. Novosad
Attorney, Agent, or Firm—Irving M. Weiner; Joseph P. Carrier; Pamela S. Burt

[57] ABSTRACT

A lawn mower includes a cutter blade rotatably disposed in a cutter housing, for cutting grass, a discharge fan rotatably disposed in the cutter housing upwardly of the cutter blade, for discharging grass clippings cut off by the cutter blade, a power source disposed outside of the cutter housing, and a speed reducer mechanism disposed outside of the cutter housing upwardly of the discharge fan, for transmitting mechanical power from the power source at a reduced speed to the discharge fan to rotate the discharge fan at a speed lower than the speed at which the cutter blade rotates. The cutter blade comprises a flat member and lies substantially horizontally.

12 Claims, 7 Drawing Sheets

LAWN MOWER

BACKGROUND OF THE INVENTION

1. Field of the Invention

The present invention relates to a lawn mower which includes a cutter and a discharge fan that are rotated by an engine on the lawn mower.

2. Description of the Relevant Art

Some lawn mowers comprise a cutter housing, an engine mounted on the cutter housing, and a cutter blade and a discharge fan which are disposed in an inner space beneath the cutter housing and rotated by the engine. One such lawn mower is disclosed in U.S. Pat. No. 3,696,595, for example. The disclosed lawn mower is propelled by the hands of the user. Grass clippings cut off by the cutting blade in the cutter housing are discharged laterally out of an outlet defined in a housing side wall, by a twisted portion of the cutter blade and air streams caused by the discharge fan.

In the conventional lawn mower, the cutter blade rotates at a higher speed than the discharge fan. During rotation of the cutter blade, its twisting portion produces turbulent airflows. These turbulent airflows impinge on each other and also on the cutter blade, thereby producing wind noise. The generation of the turbulent airflows, which are primarily responsible for the wind noise, is related to the thickness of a turbulent boundary layer which is produced when air flows along the surface of the cutter blade. The thickness of the turbulent boundary layer is proportional to the distance over which the air flows along the cutter blade surface.

The present invention has been made in an effort to eliminate the aforesaid drawback of the conventional lawn mower.

SUMMARY OF THE INVENTION

It is an object of the present invention to provide a lawn mower which is constructed to reduce wind noise that is caused by rotation of a cutter blade.

According to the present invention, there is provided a lawn mower comprising a cutter housing, a cutter blade rotatably disposed in the cutter housing, for cutting grass, a discharge fan rotatably disposed in the cutter housing upwardly of the cutter blade, for discharging grass clippings cut off by the cutter blade, a power source disposed outside of the cutter housing, a transmission mechanism for transmitting mechanical power from the power source to the cutter blade to rotate the cutter blade, and a speed reducer mechanism disposed outside of the cutter housing upwardly of the discharge fan, for transmitting mechanical power from the power source at a reduced speed to the discharge fan to rotate the discharge fan at a speed lower than the speed at which the cutter blade rotates. The cutter blade comprises a flat member and lies substantially horizontally.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Identical reference numerals denote identical parts throughout views.

Figure 1:
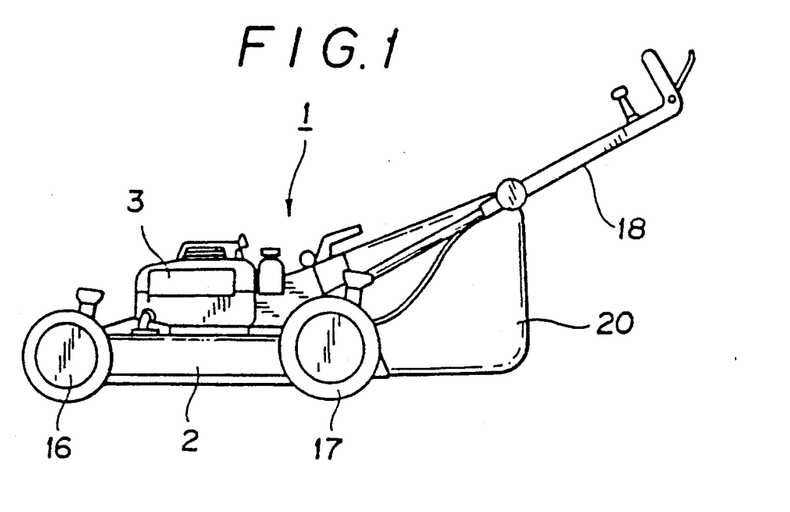
FIG. 1 is a side elevational view of a lawn mower according to a first embodiment of the present invention.

As shown FIG. 1, a lawn mower 1 according to a first embodiment of the present invention, which is typically pushed by the user in operation, comprises a substantially cylindrical cutter housing 2, an engine 3 mounted on the cutter housing 2, and two front wheels 16 and two rear wheels 17 which are rotatably supported on front and rear portions of side walls of the cutter housing 2. The lawn mower 1 also has a handle 18 which is gripped by the user, and a grass bag 20 for receiving grass clippings discharged from the cutter housing 2.

Figure 2:
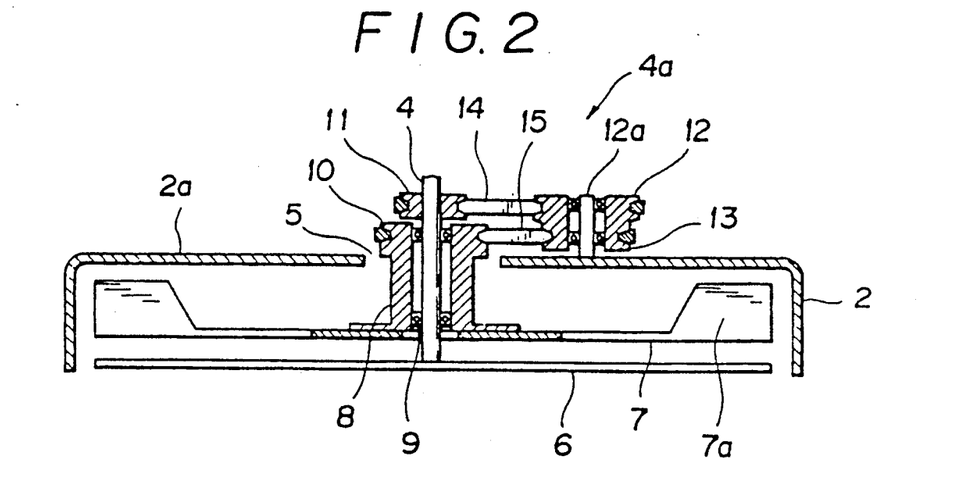
FIG. 2 is a vertical cross-sectional view of a portion of the lawn mower shown in FIG. 1, including a cutter blade and a discharge fan.

As illustrated in FIG. 2, the engine 3 has an output shaft 4 extending downwardly through a central opening 5 defined in a top deck 2a of the cutter housing 2, the output shaft 4 projecting into the interior of the cutter housing 2. A cutter blade 6 for cutting off grass clippings is fixed to the lower end of the output shaft 4.

A tubular fan holder 8 is rotatably mounted on the output shaft 4 by a bearing 9. The fan holder 8 extends from within the cutter housing 2 upwardly beyond the top deck 2a. A discharge fan 7 which comprises a plurality of radial fan blades is fixed to the lower end of the holder 8. The discharge fan 7 is disposed within the cutter housing 2 and has substantially the same radius as that of the cutter blade 6. The fan blades of the discharge fan 7 have respective vertical fins 7a at their radially outer ends.

The cutter blade 6 is driven directly by the engine output shaft 4. The discharge fan 7 is rotated in the same direction as the cutter blade 6 by the engine output shaft 4 through a speed reducer mechanism 4a which is disposed above the discharge fan 7 and mounted on the cutter housing 2 outside thereof. The fan holder 8 has a larger-diameter pulley 10 integral to an upper end thereof above the top deck 2a. A smaller-diameter pulley 11 is fixed to the output shaft 4 upwardly of the larger-diameter pulley 10. The top deck 2a supports thereon an upwardly extending support shaft 12a. A two-pulley rotor having an upper larger-diameter pulley 12 and a lower smaller-diameter pulley 13 is rotatably mounted on the support shaft 12a by a bearing. The speed reducer mechanism 4a comprises the pulleys 10, 11, 12, 13, a transmission belt 14 trained around the pulleys 11, 12, and a transmission belt 15 trained around the pulleys 10, 13. Rotation of the output shaft 4 is transmitted through the speed reducer mechanism 4a to the fan holder 8. Therefore, the discharge fan 7 is rotated at a speed lower than the speed of the cutter blade 6, whereas the cutter blade 6 is rotated at the same speed as the output shaft 4.

Figure 3A:
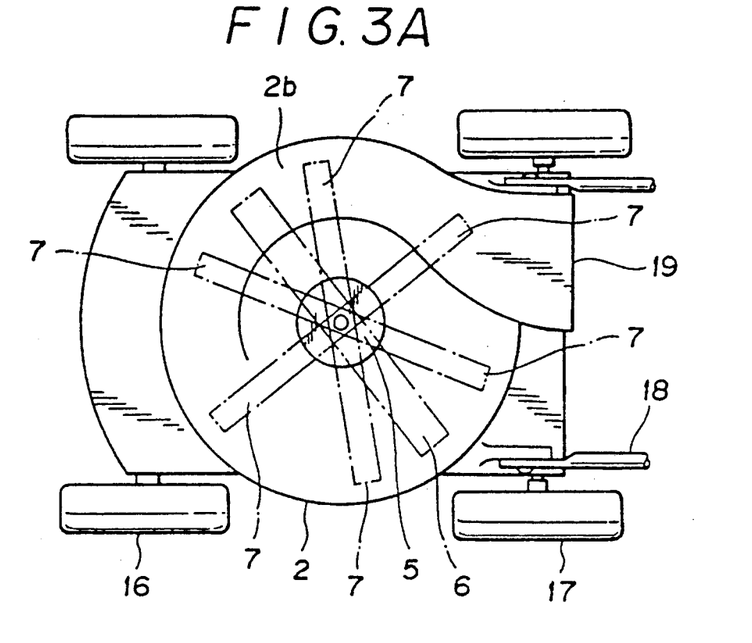
FIG. 3A is a plan view of the lawn mower shown in FIG. 1.
Figure 3B:
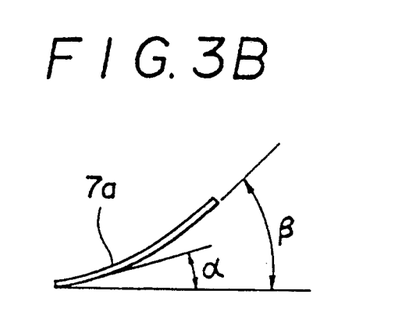
FIG. 3B is a cross-sectional view of the discharge fan.

As shown in FIGS. 3A and 3B, the cutter blade 6 comprises a single blade, and the discharge fan 7 has six fan blades extending radially outwardly from the holder 8. The discharge fan 7 may have three or more fan blades. As shown in FIG. 3A, the discharge fan 7 may comprise three elongate members each connected at its center to the fan holder 8 and having two diametrically opposite fan blades. Grass clippings which are cut off by the cutter blade 6 pass through a discharge chute 2b in the cutter blade 2, and are expelled from an outlet 19 thereof into the grass bag 20.

If the cutter blade 6 rotates at a speed of 3,100 rpm, then each of the fins 7a of the discharge fan 7 has a maximum twist height (i.e., from the lower edge to the upper edge) of 50 mm, and rotates at a speed which is about half or two thirds (1,500 or 2,000 rpm) of the speed of the cutter blade 6. As shown in FIG. 3B, each fin 7a has a curved configuration whose entry angle $\alpha$ is about 30° and discharge angle $\beta$ is about 45°. The radius of rotation, the speed of rotation, the number, and twist height of the fins 7a may be determined in view of various design considerations. However, it is preferable to increase the number and twist height of fins as the speed of rotation of the fins is lower. In order for the fins 7a to raise the grass effectively due to their suction effect, it is preferable that the circular path along which the fins 7a rotate and the circular path along which the cutting edges of the cutter blade 6 rotate substantially overlap each other as viewed in plan.

Figure 4A:
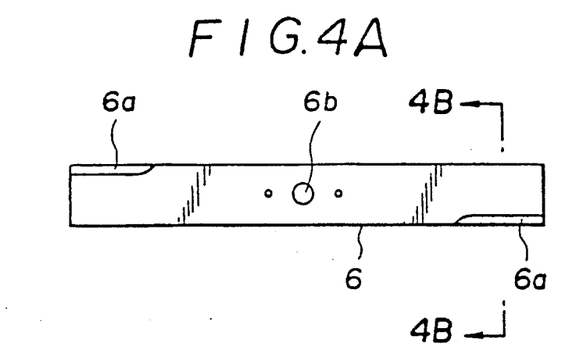
FIG. 4A is a plan view of the cutter blade.
Figure 4B:
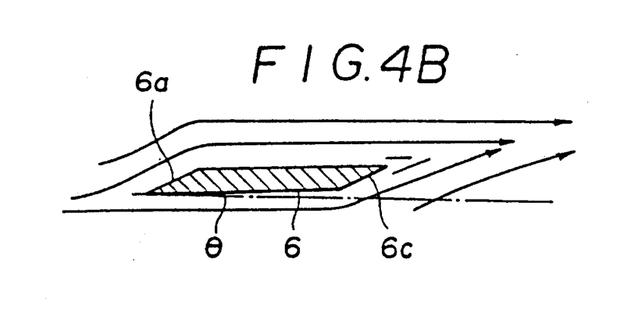
FIG. 4B is a cross-sectional view taken along line 4B—4B of FIG. 4A.

As shown in FIGS. 4A and 4B, the cutter blade 6 comprises a substantially rectangular flat plate-like member which is horizontally secured to the output shaft 4 at its central hole 6b. The cutter blade 6 has a pair of cutting edges 6a on its longitudinally opposite ends, the cutting edges 6a being on leading margins of the plate-like member in the direction in which it rotates. The cutter blade 6 is also partly cut off to provide slanted surfaces 6c on the lower surfaces of trailing margins in the direction in which it rotates. Therefore, as shown in FIG. 4B, the cutter blade 6 has a substantially parallelogrammatic transverse cross-sectional shape, including the cutting edge 6a. The cutter blade 6 lies horizontally. However, in order to facilitate clipping of the grass, it may be slightly twisted so that the cutter blade 6 is inclined to the horizontal plane at an angle $\theta$ ranging from 2° to 5°.

When the lawn mower 1 is pushed by the user in operation, the grass that has entered the cutter housing 2 is raised by air which is sent by the fan 7 which is relatively large in size and rotates at a relatively low speed. The raised grass is then clipped effectively by the cutting edges 6a of the cutter blade 6. The grass clippings are then delivered by the air flow from the fan 7 through the chute 2b and the outlet 19 into the grass bag 20. As indicated by the arrows in FIG. 4B, airflows produced during rotation of the cutter blade 6 contain almost no turbulent flows.

The cutter blade 6 is in the form of a flat member, as described above. Stated otherwise, unlike the conventional cutter blade, the cutter blade 6 does not have any twisted portions for producing air flows with which grass clippings would otherwise be discharged. The cutter blade 6 lies substantially horizontally so that its exclusive function is to cut the grass. Therefore, even when the cutter blade 6 rotates at a high speed, almost no turbulent airflows are generated thereby, and any wind noise is minimized. The slanted surfaces 6c on the trailing margins of the cutter blade 6 are effective in suppressing turbulent airflows. The grass clippings can be well discharged by the discharge fan 7 which is large in size and rotates at low speed.

The principles of the present invention are also applicable to a self-propelled lawn mower.

Figure 5A:
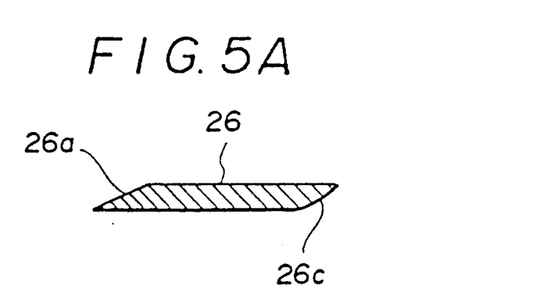
FIGS. 5A and 5A are cross-sectional views of cutter blades according to modifications of the present invention.
Figure 5B:
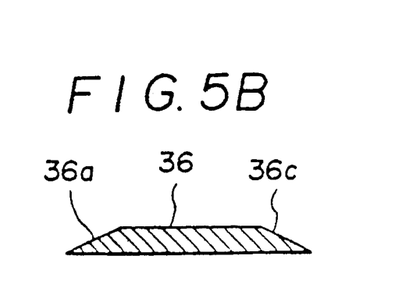

FIGS. 5A and 5B show cutter blades according to modifications of the present invention.

As shown in FIG. 5A, a cutter blade 26 has a cutting edge 26a on the front margin in the direction in which it rotates and a slanted surface 26c on the lower surface of the trailing margin in the direction in which it rotates. The region in which the slanted surface 26c is joined to the lower surface of the cutter blade 26 is rounded off. Although not shown, the cutter blade 26 is in the form of a substantially rectangular, flat plate-like member.

As shown in FIG. 5B, a cutter blade 36 has a cutting edge 36a on the front margin in the direction in which it rotates and a slanted surface 36c on the upper surface of the trailing margin in the direction in which it rotates. The cutter blade 36, therefore, has a trapezoidal transverse cross-sectional shape. Although not shown, the cutter blade 36 is also in the form of a substantially rectangular flat plate-like member.

The cutter blades 26, 36 offer the same advantages as those of the cutter blade 6 shown in FIGS. 4A and 4B.

Figures 6A, 6B, 6C:
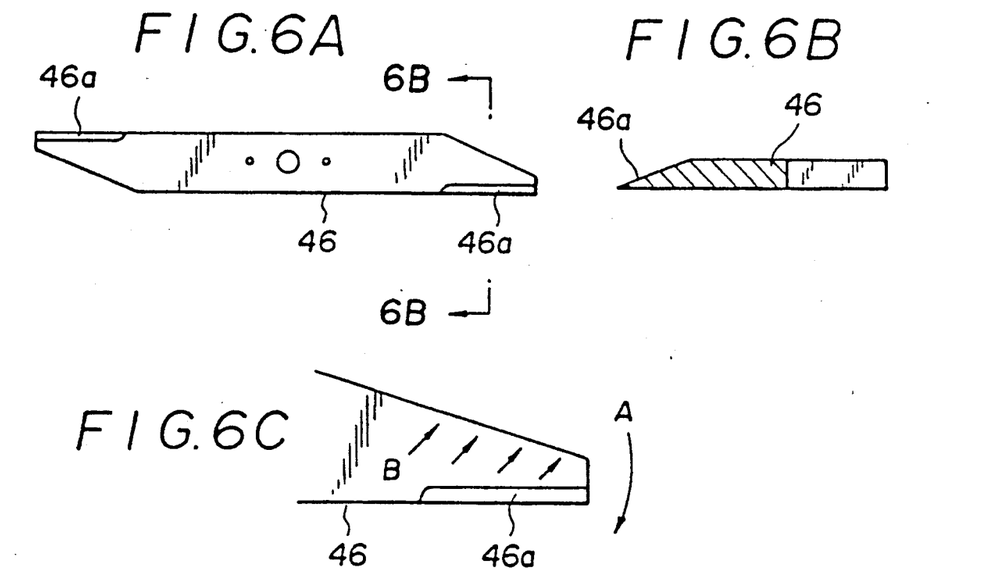
FIG. 6A is a plan view of a cutter blade according to another modification of the present invention.
FIG. 6B is a cross-sectional view taken along line 6B—6B of FIG. 6A.
FIG. 6C is an enlarged fragmentary plan view of the cutter blade shown in FIG. 6A.

FIGS. 6A, 6B, and 6C show another modified cutter blade.

As shown in FIG. 6B, a cutter blade 46 has a cutting edge 46a on the front margin in the direction in which it rotates, but has no slanted surface on its trailing margin. Rather, the cutter blade 46 is cut off at the trailing corners thereof as shown FIG. 6A. Therefore, the cutter blade 46 is shaped like an elongate parallelogram as viewed in plan. The cutter blade 46 is tapered off, or gradually narrower in width, from its center toward its opposite ends.

As shown in FIG. 6C, when the cutter blade 46 rotates about its center in the direction indicated by the arrow A, airflows as indicated by the arrows B are developed on the upper and lower surfaces of the cutter blade 46 in a direction obliquely crossing the radius of rotation of the cutter blade 46. Since the cutter blade 46 is tapered off toward its ends, the distance over which the airflows travel on the cutter blade 46 is short, and the thickness of a turbulent boundary layer on the cutter blade 46 is small. Consequently, any turbulent airflows produced by the cutter blade 46 are reduced, and any wind noise caused during rotation of the cutter blade 46 is minimized.

Various parallelogrammatic cutter blades, other than the cutter blade 46 shown in FIG. 6A, may be employed according to the present invention.

Figure 7A:
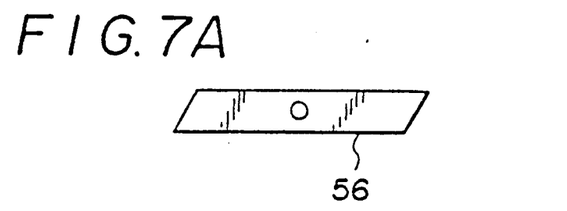
FIGS. 7A through 7D are plan views of other modified cutter blades.
Figure 7B:
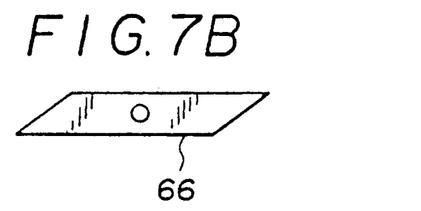
Figure 7C:
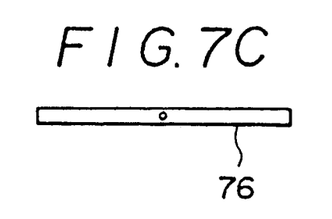
Figure 7D:
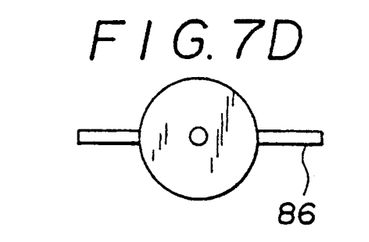

FIGS. 7A and 7B show other such parallelogrammatic cutter blades 56, 66. FIG. 7C shows a cutter blade 76 in the form of a long slender member. FIG. 7D shows a cutter blade 86 comprising a central disc with two shorter slender members attached thereto at diametrically opposite positions. The cutting edges on the front margins and the slanted surfaces and/or cutouts on the rear margins are omitted from illustration in FIGS. 7A through 7D.

Figure 8:
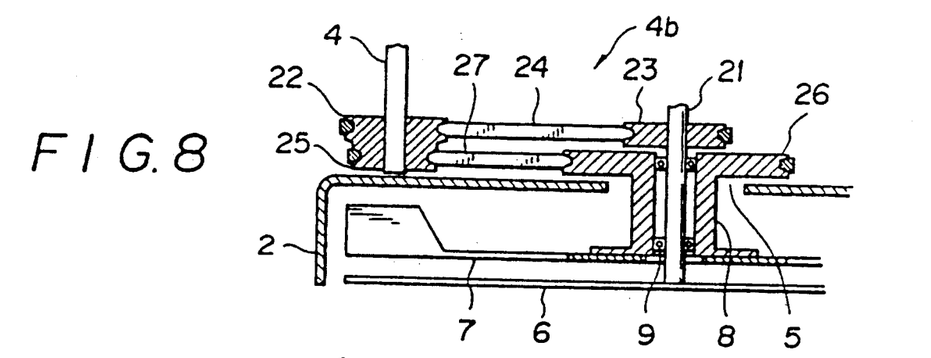
FIGS. 8 through 10 are cross-sectional views showing speed reducer mechanisms for discharge fans, according to modifications of the present invention.
Figure 9:
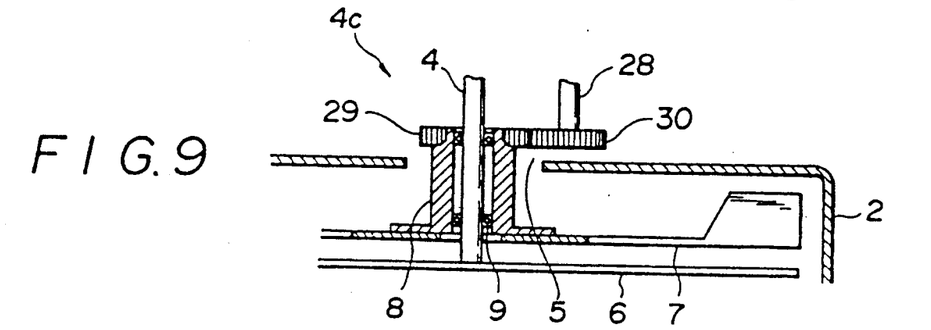
Figure 10:
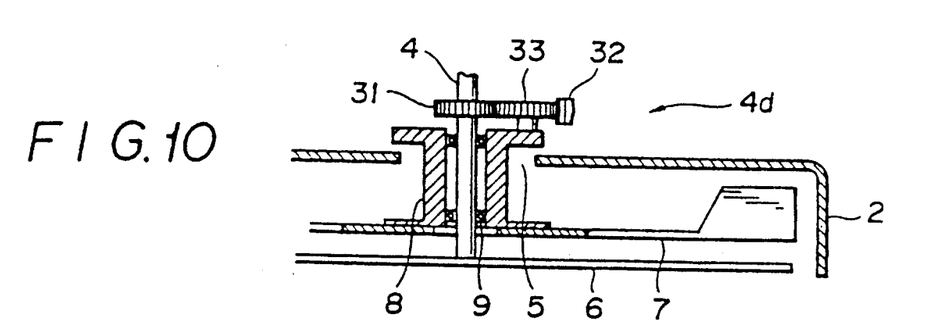

FIGS. 8 through 10 show speed reducer mechanisms for the discharge fans, according to other modifications of the present invention. Those parts shown in FIGS. 8 through 10 which are identical to those shown in FIGS. 1 and 2 are indicated by identical reference numerals.

FIG. 8 shows a speed reducer mechanism 4b which comprises a two-pulley rotor mounted on the lower end of the output shaft 4 and having an upper larger-diameter pulley 22 and a lower smaller-diameter pulley 25, a larger-diameter pulley 26 on the upper end of the fan holder 8, and a smaller-diameter pulley 23 mounted on a shaft 21 upwardly of the pulley 26. The fan holder 8 is rotatably mounted on the shaft 21, and the cutter blade 6 has its center secured to the lower end of the shaft 21. The speed reducer mechanism 4b also includes a transmission belt 24 trained around the pulleys 22, 23, and a transmission belt 27 trained around the pulleys 25, 26. The upper end of the shaft 21 is rotatably supported by a frame of the lawn mower. The upper pulley 22 of the two-pulley rotor has the same diameter as that of the smaller-diameter pulley 23 on the shaft 21. Therefore, the cutter blade 6 rotates at the same speed as the output shaft 4. The diameter of the lower pulley 25 of the two-pulley rotor is substantially smaller than the diameter of the pulley 26 of the fan holder 8. Therefore, the discharge fan 7 rotates at a speed lower than the speed of the output shaft 4. The speed reducer mechanism 4b is suitable for use on a lawn mower in which the output shaft 4 is not aligned with the shaft 21.

FIG. 9 shows a speed reducer mechanism 4c which comprises a larger-diameter gear 29 mounted on the upper end of the fan holder 8, and a smaller-diameter gear 30 mounted on the lower end of a camshaft 28 of the engine and meshing with the gear 29. The cutter blade 6, which is directly connected to the output shaft 4, rotates at the same speed as the output shaft 4. The fan holder 8 rotates at a speed lower than the speed of the camshaft 28 since the larger-diameter gear 29 on the fan holder 8 is in mesh with the smaller-diameter gear 30 on the camshaft 28.

FIG. 10 shows a speed reducer mechanism 4d in the form of a planetary gear mechanism. The speed reducer mechanism 4d comprises a sun gear 31 mounted on an upper portion of the output shaft 4, a ring gear 32 fixed to a frame of the lawn mower, and a plurality of planet gears 33 rotatably supported on the upper end of the fan holder 8 and held in mesh with the gears 31, 32. The blade 6 rotates at the same speed as that of the output shaft 4, and the fan 7 rotates at a speed lower than the speed of the output shaft 4.

Figure 11:
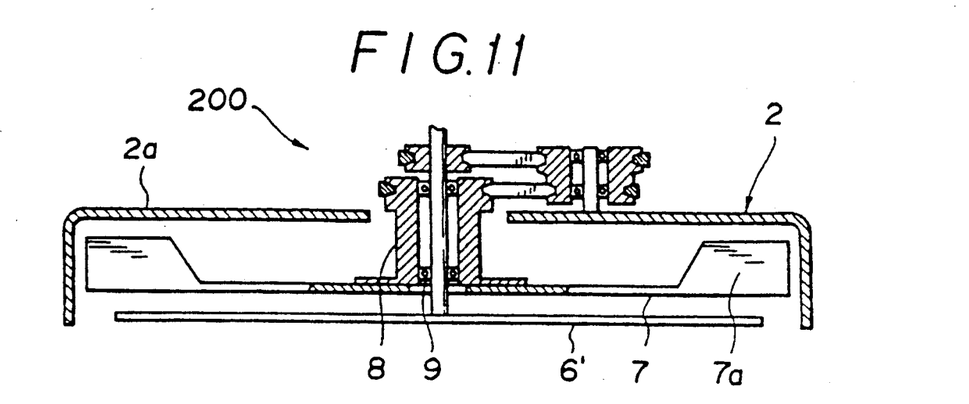
FIG. 11 is a vertical cross-sectional view of a lawn mower according to a second embodiment of the present invention.

FIG. 11 illustrates a lower mower 200 according to a second embodiment of the present invention. Those parts shown in FIG. 11 which are identical to those of the lawn mower 1 shown in FIGS. 1 and 2 are denoted by identical reference numerals.

The lawn mower 200 differs from the lawn mower 1 in that a cutter blade 6' rotates along a circular path whose radius is smaller than the radius of the circular path along which the discharge fan 7 rotates.

Generally, in lawn mowers of the type described above, the gap between the tip ends of the cutter blade and the inner surface of the peripheral wall of the cutter housing is relatively small in order to prevent grass clippings from being impelled out of the cutter housing and scattered around without passage through the chute. Therefore, depending on the height and/or rigidity of the grass to be clipped, the grass may be turned over by the cutter housing when the lawn mower runs, and may not be well clipped.

Figure 12:
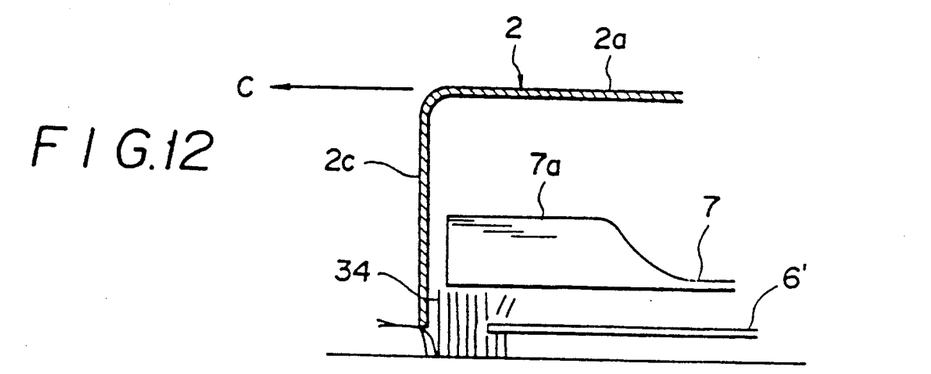
FIG. 12 is an enlarged fragmentary view of the lawn mower shown in FIG. 11.

When the lawn mower 200 moves forwardly in the direction indicated by the arrow C in FIG. 12, grass 34 is first turned over by the outer surface of a peripheral wall 2c of the cutter housing 2. Since the radius of the circular path of the cutter blade 6 is smaller than the radius of the circular path of the fan 7, the tip ends of the cutter blade 6 and the inner surface of the peripheral wall 2c define therebetween a gap which is large enough to allow the grass 34, which has once been turned over, to be raised by airflows produced by the fan 7. As a result, the grass 34 which is raised is well cut off or clipped by the cutter 6, and the grass clippings are expelled through the chute 2b and the outlet 19 into the grass bag 20.

Figure 13:
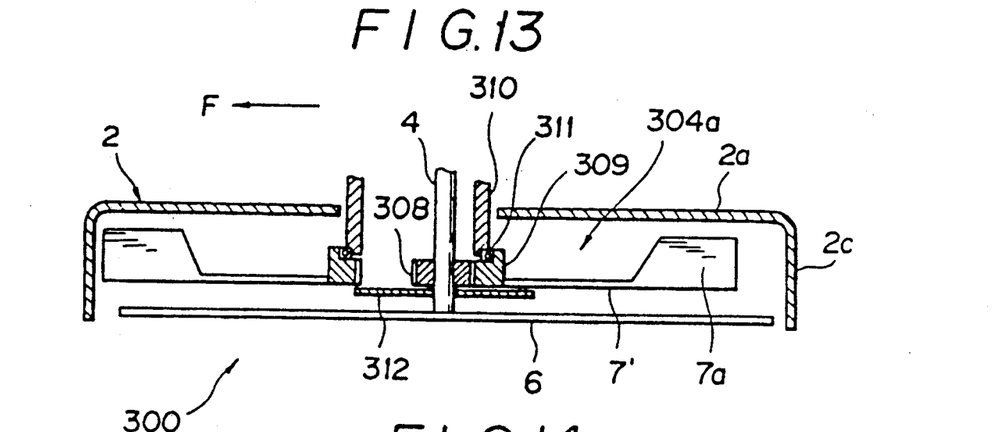
FIG. 13 is a vertical cross-sectional view of a lawn mower according to a third embodiment of the present invention.
Figure 14:
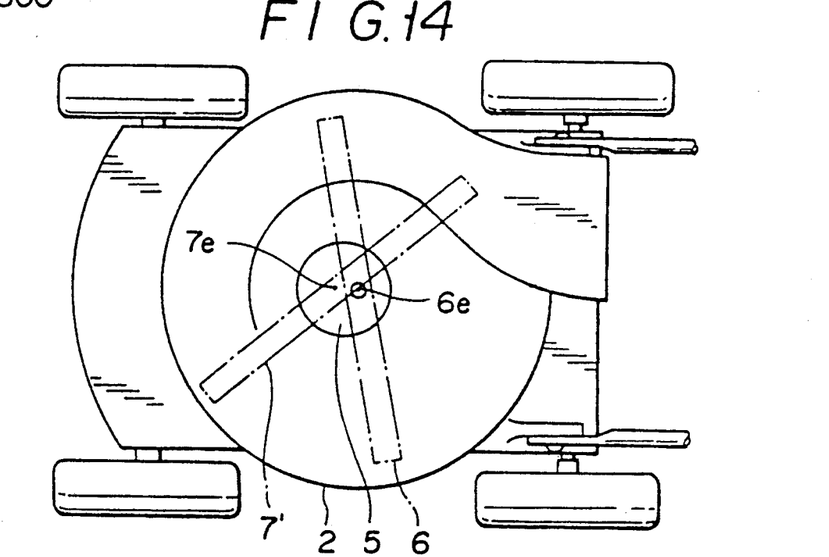
FIG. 14 is a plan view of the lawn mower shown in FIG. 13.
Figure 15:
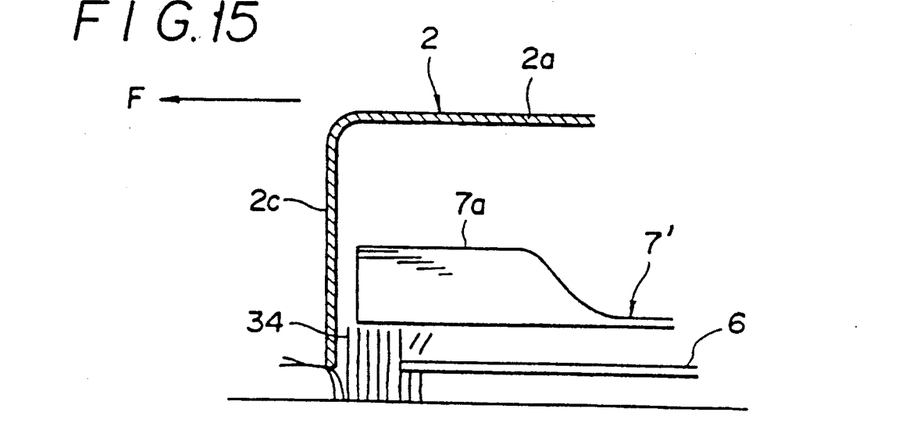
FIG. 15 is an enlarged fragmentary view of the lawn mower shown in FIG. 13.

FIGS. 13 through 15 show a lawn mower 300 according to a third embodiment of the present invention.

In the lawn mowers according to the previous embodiments, the cutter blade and the discharge fan rotate about the same axis. In the lawn mower 300, however, the flat cutter blade 6 rotates about an axis 6e which is aligned with the center of the housing 2, and a discharge fan 7' rotates about an axis 7e which is displaced forwardly from the axis 6e. More specifically, as shown in FIG. 13, the output shaft 4 about which the cutter blade 6 rotates is aligned with the center of the cutter housing 2. A cylindrical member 310 fixed to a lawn mower frame is vertically disposed such that its center is displaced forwardly from the output shaft 4 in the direction indicated by the arrow F. A ring gear 309 having gear teeth on its inner peripheral surface is rotatably attached concentrically to the lower end of the cylindrical member 310 which is disposed in the cutter housing 2. The fan 7' includes a plurality of (e.g., six) radial fan blades which are attached to the outer periphery of the ring gear 309. Only two of those radial fan blades are shown in FIG. 14 for the sake of brevity. The fan 7' rotates along a circular path whose radius is substantially the same as the radius of a circular path along which the cutter blade 6 rotates. A gear 308 held in mesh with the ring gear 309 is mounted on the output shaft 4. A shield disc 312 is fixed to the output shaft 4 beneath the gear 308, for preventing grass clippings from entering the space between the gears 308, 309. A speed reducer mechanism 304a for the discharge fan 7' comprises only the gears 308, 309.

When the lawn mower 300 is moved forwardly, the grass 34 is raised and clipped, as shown in FIG. 15, since the cutter blade 6 is held out of alignment with the fan 7', leaving a gap between the peripheral wall 2c and the tip ends of the cutter blade 6, as is the case with the lawn mower shown in FIGS. 11 and 12.

Another advantage of the lawn mower 300 is that because the center of the fan 7' is not aligned with the center of the cutter blade 6, the speed reducer mechanism 304a for the fan 7' is constructed of only the gears 308, 309.

Figure 16:
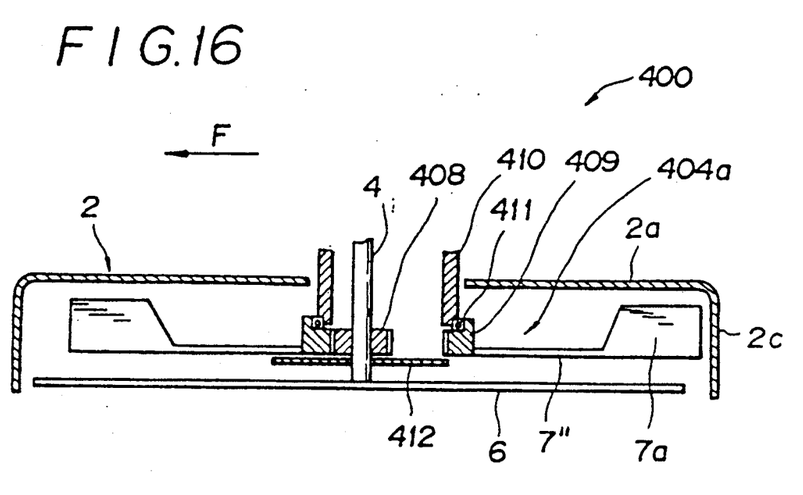
FIG. 16 is a vertical cross-sectional view of a lawn mower according to a fourth embodiment of the present invention.
Figure 17:
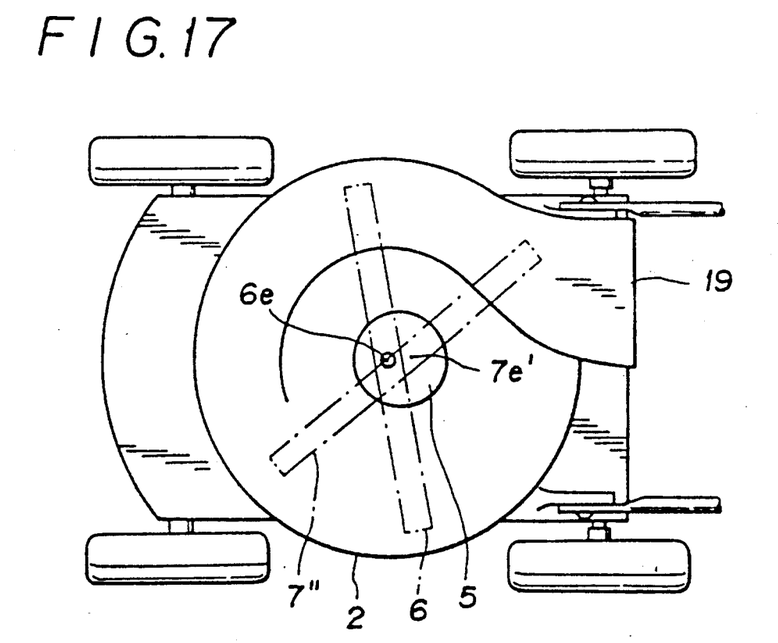
FIG. 17 is a plan view of the lawn mower shown in FIG. 16.

FIGS. 16 and 17 show a lawn mower 400 according to a fourth embodiment of the present invention.

In the lawn mower 400, the cutter blade 6 rotates about an axis 6e which is aligned with the center of the housing 2, and a discharge fan 7" rotates about an axis 7e' which is displaced rearwardly from the axis 6e. More specifically, as shown in FIG. 17, the output shaft 4 about which the cutter blade 6 rotates is aligned with the center of the cutter housing 2. A cylindrical member 410 fixed to a lawn mower frame is vertically disposed such that its center is displaced rearwardly from the output shaft 4 in the direction opposite to the forward direction indicated by the arrow F. A ring gear 409 having gear teeth on its inner peripheral surface is rotatably attached concentrically to the lower end of the cylindrical member 410 which is disposed in the cutter housing 2. The fan 7" includes a plurality of (e.g., six) radial fan blades which are attached to the outer periphery of the ring gear 409. Only two of those radial fan blades are shown in FIG. 17 for the sake of brevity. The fan 7" rotates along a circular path whose radius is substantially the same as the radius of a circular path along which the cutter blade 6 rotates. A gear 408 held in mesh with the ring gear 409 is mounted on the output shaft 4. A shield disc 412 is fixed to the output shaft 4 beneath the gear 408 for preventing grass clippings from entering the space between the gears 408, 409. A speed reducer mechanism 404a for the discharge fan 7" comprises only the gears 408, 409.

Since the center of the fan 7" is not aligned with the center of the cutter blade 6, the speed reducer mechanism 404a for the fan 7" is constructed of only the gears 408, 409. The fan 7" is positioned more closely to the outlet 19 because the center of the fan 7" is displaced rearwardly from the center of the cutter blade 6.

Figure 18:
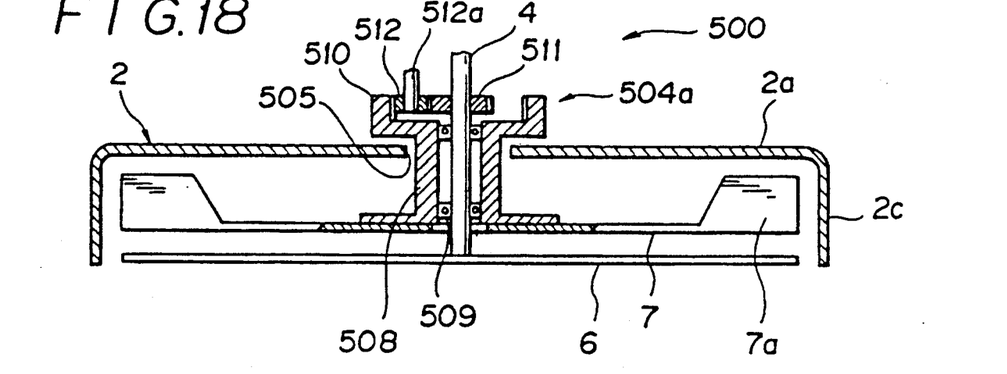
FIG. 18 is a vertical cross-sectional view of a lawn mower according to a fifth embodiment of the present invention.
Figure 19:
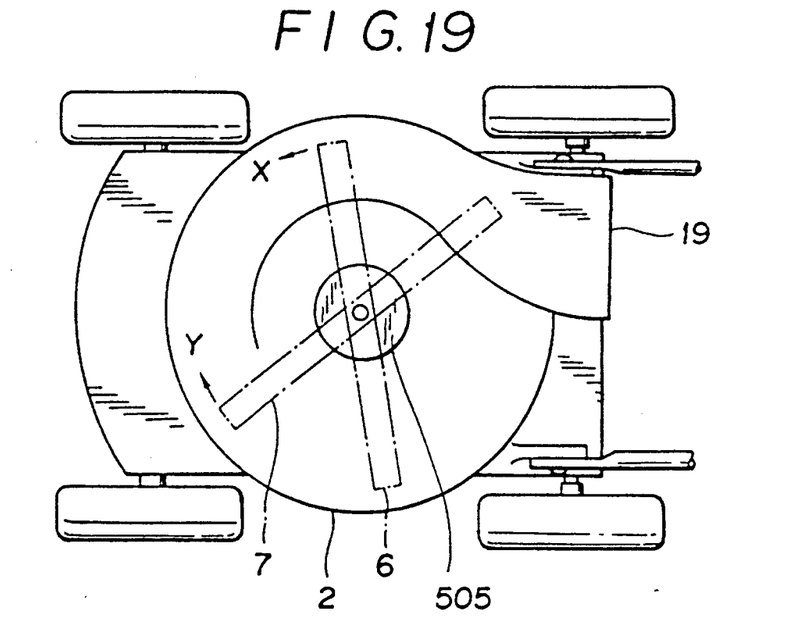
FIG. 19 is a plan view of the lawn mower shown in FIG. 18.

FIGS. 18 and 19 illustrate a lawn mower 500 according to a fifth embodiment of the present invention.

In the lawn mowers according to the previous embodiments, the discharge fan rotates at a reduced speed in the same direction as the cutter blade. In the lawn mower 500, however, the discharge fan 7 is rotated by a speed reducer mechanism 504a at a reduced speed in the direction opposite to the direction in which the cutter blade 6 rotates. The other structural details of the lawn mower 500 are the same as those of the lawn mower 1 shown in FIGS. 1 and 2.

The cutter blade 6 is rotated directly by the engine output shaft 4, and the discharge fan 7 is rotated by the output shaft 4 at a reduced speed in the direction opposite to the direction in which the cutter blade 6 rotates, through the speed reducer mechanism 504a which is disposed outside of the cutter housing 2. More specifically, a fan holder 508 is rotatably mounted concentrically on the output shaft 4, which is positioned concentrically with the cutter housing 2, through a bearing 509. The fan 7, which comprises a plurality of radial fan blades, is fixed to the lower end of the fan holder 508. The fan 7 rotates along a circular path whose radius is substantially the same as the radius of a circular path along which the cutter blade 6 rotates. A ring gear 510 having gear teeth on its inner periphery is integral to the upper end of the fan holder 508. A single gear 511, serving as a sun gear, is fixed to the output shaft 4 in horizontal alignment with the ring gear 510. A plurality of idle gears 512 are held in mesh with the gears 510, 511. Each of the idle gears 512 is rotatably supported on a shaft 512a which is secured to a lawn mower frame. The speed reducer mechanism 504a comprises these gears 510, 511, 512. The cutter blade 6 comprises a single blade, whereas the fan 7 comprises six fan blades. Only two of these fan blades are shown in FIG. 19 for the sake of brevity.

Figure 20:
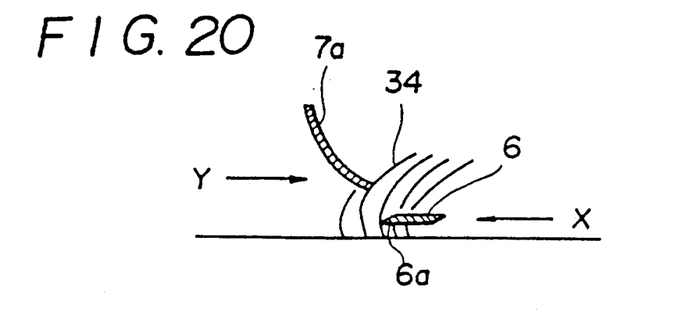
FIG. 20 is an enlarged fragmentary view of the lawn mower shown in FIG. 18.

The cutter blade 6 rotates in the direction indicated by the arrow X in FIGS. 19 and 20, and the fan 7 rotates in the direction indicated by the arrow Y at a speed lower than the speed of the cutter blade 6. When the grass 34 is clipped by the lawn mower 500, as shown in FIG. 20, the grass 34 is pushed and raised in the direction indicated by the arrow Y by airflows which are produced by the fan blades 7a of the fan 7. Therefore, the grass 34 to be clipped tends to sway in the direction in which the fan 7 rotates. The cutter blade 6, however, rotates in the direction indicated by the arrow X, which is opposite to the direction indicated by the arrow Y. Consequently, the cutting edges 6a of the cutter blade 6 counteract the grass 34, so that the cutter blade 6 can effectively clip the grass 34.

The reverse speed reducer mechanism for the fan 7 is not limited to the speed reducer mechanism 504a, but may be of any of various known types.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:
1. A lawn mower comprising:
a cutter housing;
a cutter blade rotatably disposed in said cutter housing, for cutting grass;
a discharge fan rotatably disposed in said cutter housing upwardly of said cutter blade, for discharging grass clippings cut off by said cutter blade;
a power source disposed outside of said cutter housing;
a transmission mechanism for transmitting mechanical power from said power source to said cutter blade to rotate the cutter blade;
a speed reducer mechanism disposed outside of said cutter housing upwardly of said discharge fan, for transmitting mechanical power from said power source at a reduced speed to said discharge fan to rotate said discharge fan at a speed lower than the speed at which said cutter blade rotates; and said cutter blade comprising a flat member and lying substantially horizontally.

2. A lawn mower according to claim 1, wherein said discharge fan rotates along a circular path whose radius is larger than the radius of a circular path along which said cutter blade rotates.

3. A lawn mower according to claim 1, wherein said discharge fan rotates about an axis which is displaced from the axis about which said cutter blade rotates.

4. A lawn mower according to claim 1, wherein said discharge fan rotates about an axis which is displaced forwardly from the axis about which said cutter blade rotates, with respect to the direction in which the lawn mower moves in operation.

5. A lawn mower according to claim 1, wherein said discharge fan rotates about an axis which is displaced rearwardly from the axis about which said cutter blade rotates, with respect to the direction in which the lawn mower moves in operation.

6. A lawn mower according to claim 1, wherein said speed reducer mechanism transmits mechanical power from said power source to said discharge fan such that the discharge fan rotates in a direction opposite to the direction in which said cutter blade rotates.

7. A lawn mower comprising:
a cutter housing;
means rotatably supported within said housing for cutting grass;
means for discharging grass clippings cut by said cutting means out of said housing, said discharge means being rotatably supported within said housing upwardly of said cutting means; and
means for rotating said cutting means at a first speed and for rotating said discharge means at a second speed lower than said first speed;
said cutting means being adapted to cut grass while generating substantially no turbulent air flows.

8. A lawn mower according to claim 7, wherein said cutting means comprises a flat cutting blade which lies substantially horizontally relative to said housing.

9. A lawn mower according to claim 1, wherein trailing edges of said cutter blade relative to a direction of rotation thereof are slanted relative to a vertical axis.

10. A lawn mower according to claim 8, wherein opposite ends of said cutter blade are tapered radially outwardly.

11. A lawn mower according to claim 7, wherein said cutting means and said discharge means are disposed within said housing such that a first gap is defined between a forward edge of the cutting means relative to a direction of travel of the lawn mower and a sidewall of the housing, and a second gap smaller than the first gap is defined between a forward edge of the discharge means and the sidewall of the housing.

12. A lawn mower according to claim 7, wherein said rotating means rotates said discharge means in a direction opposite to the direction in which said cutting means is rotated.

* * * * *

UNITED STATES PATENT AND TRADEMARK OFFICE
CERTIFICATE OF CORRECTION

PATENT NO. : 5,012,633
DATED : MAY 7, 1991
INVENTOR(S) : Ito et al.

It is certified that error appears in the above-identified patent and that said Letters Patent is hereby corrected as shown below:

On cover page, [73] the correct assignee should be: "Honda Giken Kogyo Kabushiki Kaisha, Tokyo, Japan".

On cover page, [30] the third priority data entry should be, "Japan ..... 1-84554".

Signed and Sealed this

Fifteenth Day of September, 1992

Attest:

DOUGLAS B. COMER

Attesting Officer

Acting Commissioner of Patents and Trademarks